(12) United States Patent
Guo et al.

(10) Patent No.: US 11,496,886 B2
(45) Date of Patent: Nov. 8, 2022

(54) METHOD AND APPARATUS FOR CONNECTION CONTROL IN A WIRELESS COMMUNICATION SYSTEM

(71) Applicant: ASUSTek Computer Inc., Taipei (TW)

(72) Inventors: Yu-Hsuan Guo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/821,320

(22) Filed: Mar. 17, 2020

(65) Prior Publication Data

US 2020/0336891 A1 Oct. 22, 2020

Related U.S. Application Data

(60) Provisional application No. 62/834,813, filed on Apr. 16, 2019.

(51) Int. Cl.
| | | |
|---|---|---|
| *H04W 60/04* | (2009.01) | |
| *H04W 72/04* | (2009.01) | |
| *H04L 5/00* | (2006.01) | |
| *H04W 8/24* | (2009.01) | |
| *H04W 8/20* | (2009.01) | |
| *H04W 76/27* | (2018.01) | |
| *H04W 68/00* | (2009.01) | |
| *H04W 76/30* | (2018.01) | |

(52) U.S. Cl.
CPC .............. *H04W 8/24* (2013.01); *H04W 8/20* (2013.01); *H04W 68/005* (2013.01); *H04W 76/27* (2018.02); *H04W 76/30* (2018.02)

(58) Field of Classification Search
None
See application file for complete search history.

(56) References Cited

U.S. PATENT DOCUMENTS

| | | | |
|---|---|---|---|
| 2015/0237597 A1 | 8/2015 | Kanamarlapudi et al. | |
| 2018/0041981 A1* | 2/2018 | Wu | H04W 72/048 |
| 2018/0160422 A1* | 6/2018 | Pathak | H04W 76/20 |
| 2018/0183655 A1 | 6/2018 | Gupta et al. | |

(Continued)

FOREIGN PATENT DOCUMENTS

| | | |
|---|---|---|
| CN | 108924817 A * | 11/2018 |
| JP | 5765129 | 8/2015 |
| KR | 20130066495 | 6/2013 |

OTHER PUBLICATIONS

Notice of Submission of Opinion from Korean Intellectual Property Office in corresponding KR Application No. 10-2020-0032723, dated Feb. 26, 2021.

(Continued)

*Primary Examiner* — Gary Lafontant
(74) *Attorney, Agent, or Firm* — Skaar Ulbrich Macari, P.A.

(57) ABSTRACT

A method and apparatus are disclosed from the perspective of a UE (User Equipment) with a first USIM (Universal Mobile Telecommunications System Subscriber Identity Module) and a second USIM. In one embodiment, the method includes the UE transmitting, to a first network node associated with the first USIM, a message carrying information related to a signaling activity between the UE and a second network node associated with the second USIM.

20 Claims, 15 Drawing Sheets

(56) References Cited

U.S. PATENT DOCUMENTS

2019/0007913 A1* 1/2019 Tsai .................. H04W 56/001

OTHER PUBLICATIONS

Notice of Submission of Opinion from Korean Intellectual Property Office in corresponding KR Application No. 10-2020-0032723, dated Aug. 13, 2021.
Office Action to the corresponding Korean Patent Application rendered by the Korean Intellectual Property Office (KIPO) dated Apr. 27, 2022, 10 pages (including English translation).

* cited by examiner

METHOD AND APPARATUS FOR CONNECTION CONTROL IN A WIRELESS COMMUNICATION SYSTEM

CROSS-REFERENCE TO RELATED APPLICATIONS

The present application claims the benefit of U.S. Provisional Patent Application Ser. No. 62/834,813 filed on Apr. 16, 2019, the entire disclosure of which is incorporated herein in its entirety by reference.

FIELD

This disclosure generally relates to wireless communication networks, and more particularly, to a method and apparatus for connection control in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment) with a first USIM (Universal Mobile Telecommunications System Subscriber Identity Module) and a second USIM. In one embodiment, the method includes the UE transmitting, to a first network node associated with the first USIM, a message carrying information related to a signaling activity between the UE and a second network node associated with the second USIM.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: SP-190248, "Revised SID: Study on system enablers for multi-SIM devices"; and TS 38.331 V15.5.0, "NR; Radio Resource Control (RRC) protocol specification". The standards and documents listed above are hereby expressly incorporated by reference in their entirety.

Figure 1:
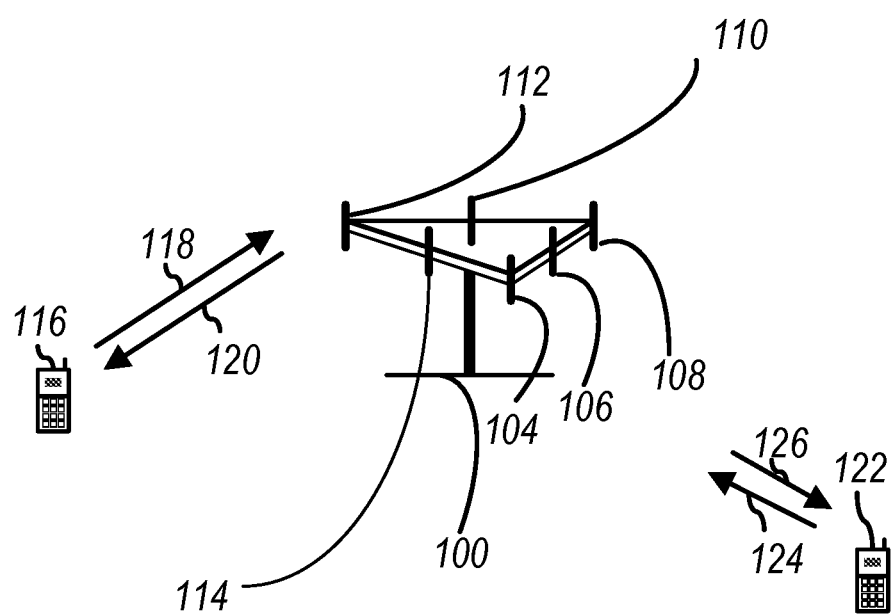
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a Next Generation Node B (gNB), or some other terminology. An access terminal (AT) may also be called user equipment (UE), a wireless communication device, terminal, access terminal or some other terminology.

Figure 2:
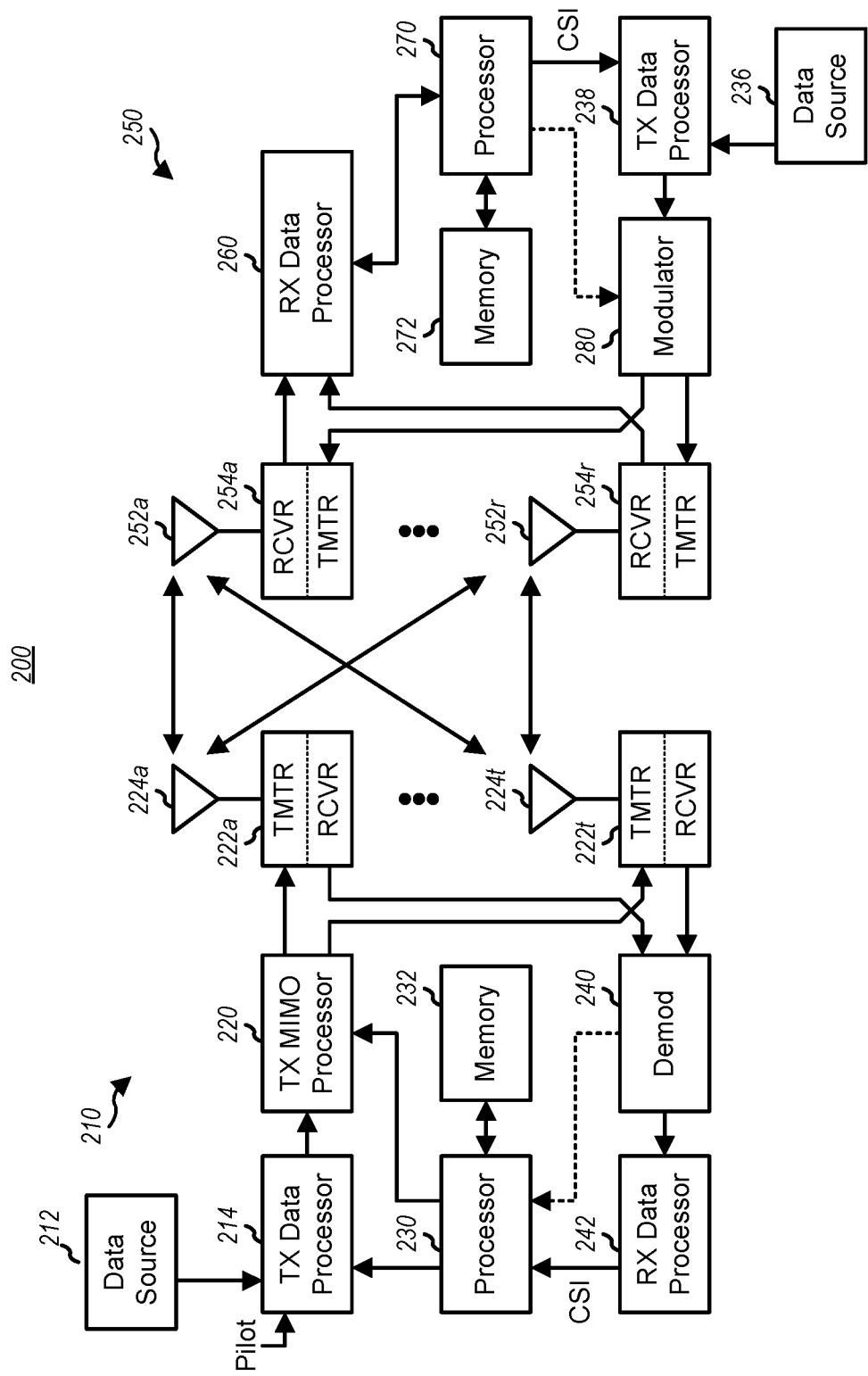
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
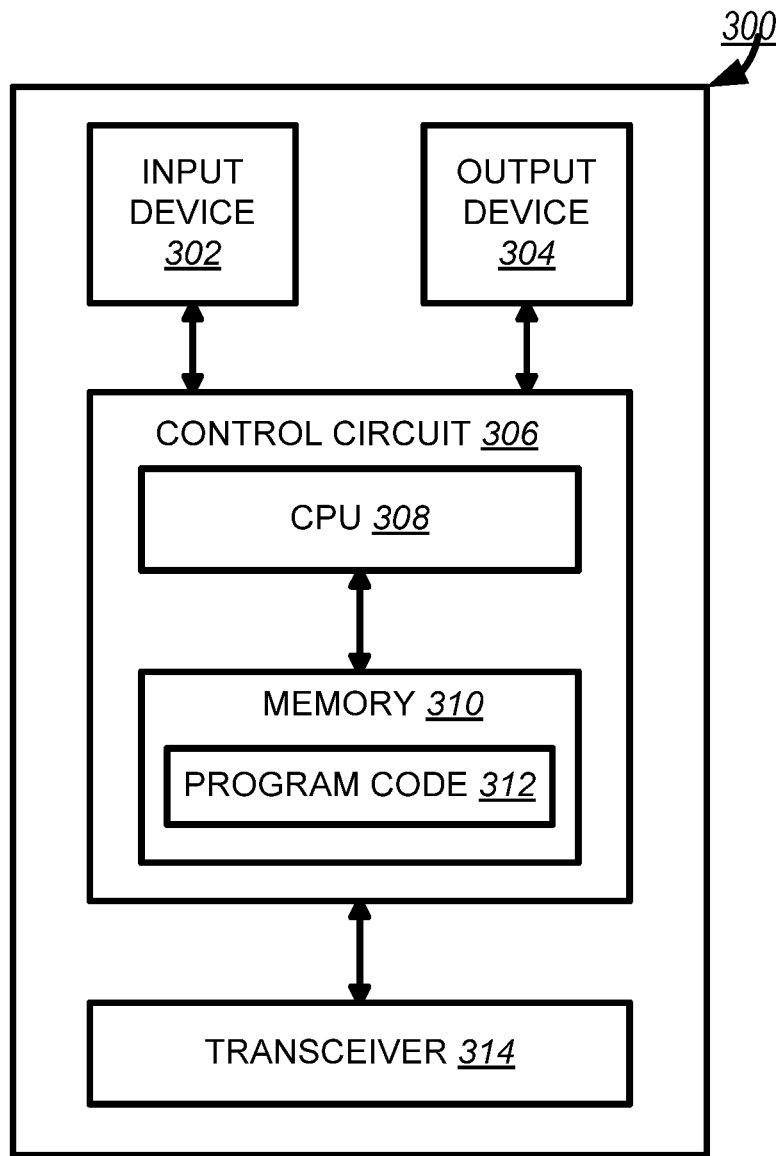
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
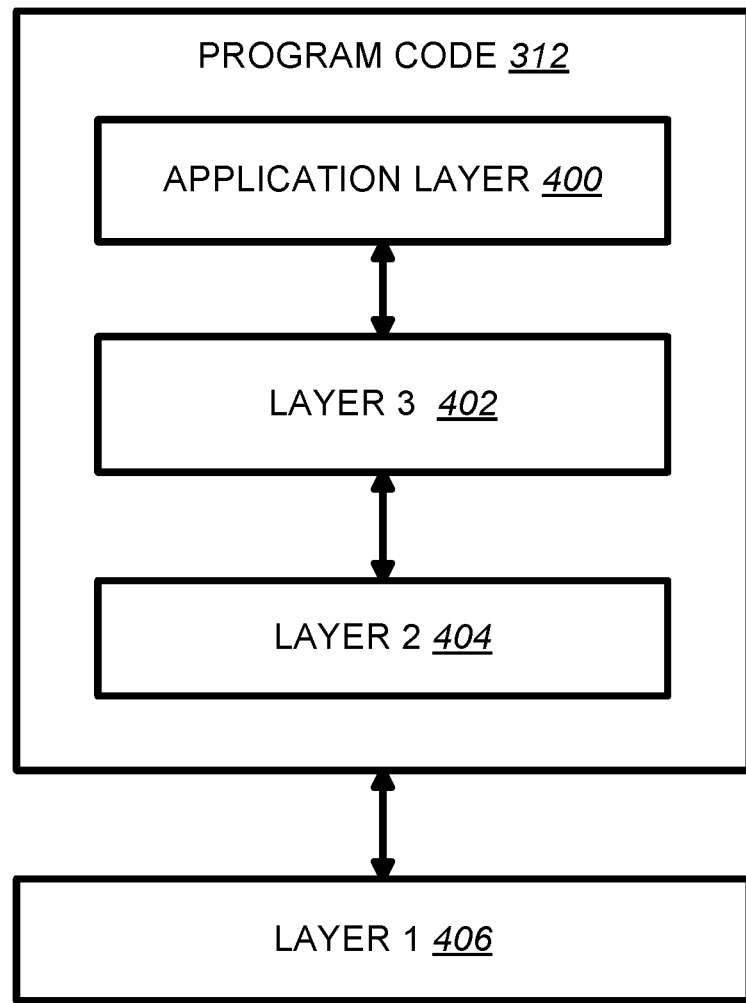
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

A study item for improvement on multi-USIM devices has been approved (as discussed in 3GPP SP-190248). Justification of this study item is discussed in 3GPP SP-190248 as follows:

Many commercially deployed devices support more than one USIM card (typically two). Multi-USIM devices typically address the following two use cases:
1) The user has both a personal and a business subscription and wishes to use them both from the same device. This use case has become popular with the BYOD initiatives in the enterprise world.
2) The user has multiple personal subscriptions and chooses which one to use based on the selected service (e.g. use one individual subscription and one "family circle" plan).

In either of the two use cases the USIMs may be from the same or from different MNOs.

In the past these kind of multi-USIM devices have been particularly popular in emerging economies, but are nowadays spreading even in regions that so far have not witnessed massive demand for multi-USIM devices.

Support for multi-USIM is currently handled in an implementation-specific manner without any support from 3GPP specifications, resulting in a variety of implementations and UE behaviours (e.g. Dual SIM Single Standby, Dual SIM Dual Standby, Dual SIM Dual Active, etc.).

For cost efficiency reasons, a multi-USIM device implementation typically uses common radio and baseband components that are shared among the multiple USIMs, which can lead to several issues that impact the 3GPP system performance. Consider a multi-USIM device that is actively engaged in communication with a 3GPP system:

While actively communicating with the first system, the UE needs to occasionally check the other system (e.g. to read the paging channel, perform measurements, or read the system information). This occasional activity on the second system may or may not have any performance impact, depending on the UE implementation.

NOTE 1: The specific aspects of how the UE manages to read information in the second system while actively communicating with the first system are not to be considered in SA2, but could be considered in RAN working groups.

Paging Occasions (POs) are calculated based on the UE identifier (IMSI and 5G-S-TMSI for EPS and 5GS, respectively). In some cases the UE identifier values associated with the different USIMs can lead to systematic collisions which may result in missed pages.

When the UE receives a page on the second system, the UE needs to be able to decide whether it should respond to the page (e.g. by following user-configured rules). In the absence of information indicating the service type that triggered the paging, the UE would have to blindly decide whether to ignore the page or respond to it.

NOTE 2: It is noted that UTRA-Uu supports a Paging Cause which indicates the traffic type that triggered the page.

When the UE decides to respond to the page in the second system, or when the UE needs to perform some signalling activity in the second system (e.g. Periodic Mobility Registration Update), the UE may need to stop the current activity in the first system. In the absence of any procedure for suspension of the ongoing activity, the UE has to autonomously release the RRC connection with the first system and abruptly leave. This is likely to be interpreted as an error case by the first system and has the potential to distort the statistics in the first system, and misguide the algorithms that rely on them. Moreover, during the UE's absence, the first system will keep paging the UE which will result in waste of paging resources.

The objective of the study item for multi-USIM devices is discussed in 3GPP SP-190248 as follows:
This study item shall address the following system enablers for multi-USIM devices:
A mechanism for delivering paging destined to USIM A while the UE is actively communicating with USIM B.
A mechanism allowing for suspension (or release) and resumption of an ongoing connection in the 3GPP system associated with USIM A, so that the UE can temporarily leave to the 3GPP system associated with USIM B, and then return to the 3GPP system in a network-controlled manner. The study shall determine how the network handles MT data or MT control-plane activity occurrence on a suspended connection.
A mechanism for avoidance of paging collisions occurring in the UE between USIM A and USIM B.
Handling of emergency calls and sessions.
Handling of service prioritization i.e. the study shall determine whether the UE behaviour upon reception of paging information is driven by USIM configuration or user preferences or both.
NOTE 1: This objective is expected to be further aligned through Stage 1 requirements. Additional objectives may be added if there are further Stage 1 requirements.
NOTE 2: The enablers for Dual-USIM are expected to also apply to multi-USIM scenarios.
The study shall be restricted to single Rx/single Tx and dual Rx/single Tx UE implementations.
NOTE 3: The focus of the study is on enablers for multi-USIM implementations relying on common radio and baseband components that are shared among the multiple USIMs.
The problem statement being common to 5GS and EPS, it is expected that the study conclusions will apply to both 5GS and EPS, but the solutions for 5GS and EPS need not be the same.
The system enablers for multi-USIM devices are expected to apply for the cases where the multiple USIMs are owned by the same or by different MNOs.

Figure 5:
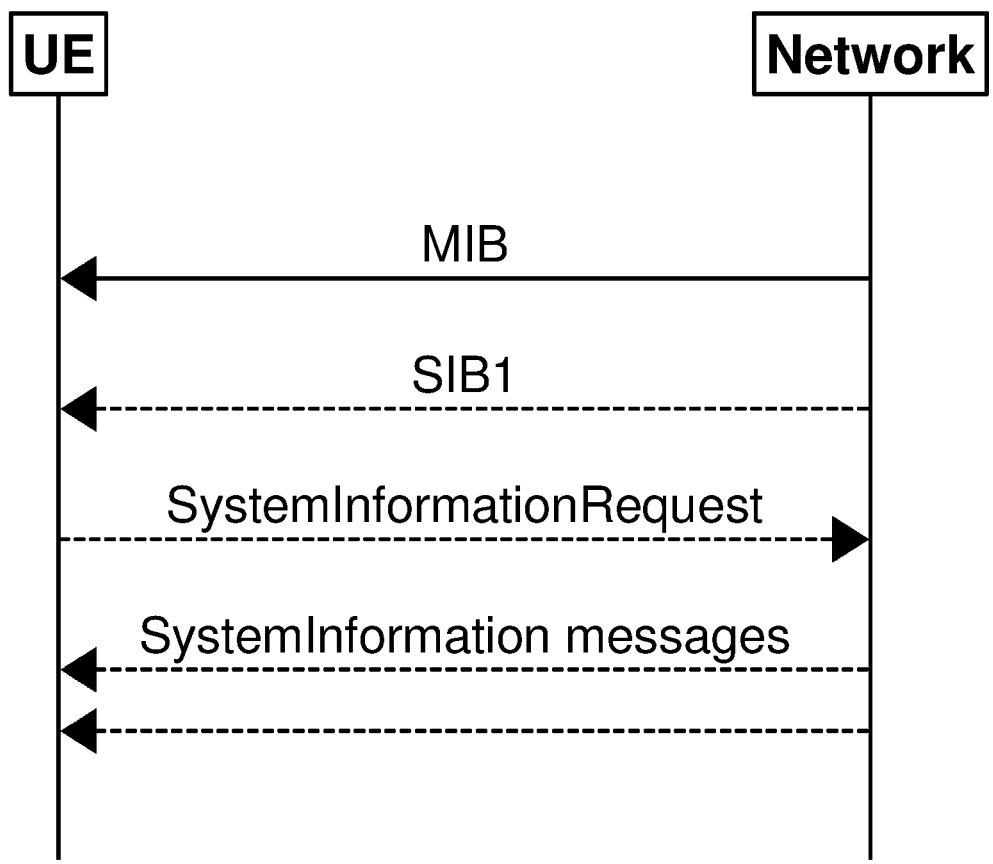
FIG. 5 is a reproduction of FIG. 5.2.2.1-1 of 3GPP TS 38.331 V15.5.0.

System information acquisition in NR is shown in FIG. 5 (which is a reproduction of FIG. 5.2.2.1-1, entitled "System information acquisition", of 3GPP TS 38.331 V15.5.0) and discussed in 3GPP TS 38.331 as follows:
5.2.2.2.2 SI Change Indication and PWS Notification
A modification period is used, i.e. updated SI (other than for ETWS and CMAS) is broadcasted in the modification period following the one where SI change indication is transmitted. The modification period boundaries are defined by SFN values for which SFN mod m=0, where m is the number of radio frames comprising the modification period. The modification period is configured by system information. The UE receives indications about SI modifications and/or PWS notifications using Short Message transmitted with P-RNTI over DCI (see clause 6.5). Repetitions of SI change indication may occur within preceding modification period.
UEs in RRC_IDLE or in RRC_INACTIVE shall monitor for SI change indication in its own paging occasion every DRX cycle. UEs in RRC_CONNECTED shall monitor for SI change indication in any paging occasion at least once per modification period if the UE is provided with common search space on the active BWP to monitor paging, as specified in TS 38.213 [13], clause 13.

ETWS or CMAS capable UEs in RRC_IDLE or in RRC_INACTIVE shall monitor for indications about PWS notification in its own paging occasion every DRX cycle. ETWS or CMAS capable UEs in RRC_CONNECTED shall monitor for indication about PWS notification in any paging occasion at least once every defaultPagingCycle if the UE is provided with common search space on the active BWP to monitor paging.

If the UE receives a Short Message, the UE shall:
  1> if the UE is ETWS capable or CMAS capable, and the etwsAndCmasIndication bit of Short Message is set:
    2> immediately re-acquire the SIB1;
    2> if the UE is ETWS capable and si-SchedulingInfo includes scheduling information for SIB6:
      3> acquire SIB6, as specified in sub-clause 5.2.2.3.2, immediately;
    2> if the UE is ETWS capable and si-SchedulingInfo includes scheduling information for SIB7:
      3> acquire SIB7, as specified in sub-clause 5.2.2.3.2, immediately;
    2> if the UE is CMAS capable and si-SchedulingInfo includes scheduling information for SIB8:
      3> acquire SIB8, as specified in sub-clause 5.2.2.3.2, immediately;
  1> if the systemInfoModification bit of Short Message is set:
    2> apply the SI acquisition procedure as defined in sub-clause 5.2.2.3 from the start of the next modification period.

5.2.2.3 Acquisition of System Information
5.2.2.3.1 Acquisition of MIB and SIB1
The UE shall:
  1> apply the specified BCCH configuration defined in 9.1.1.1;
  1> if the UE is in RRC_IDLE or in RRC_INACTIVE:
    2> acquire the MIB, which is scheduled as specified in TS 38.213 [13];
    2> if the UE is unable to acquire the MIB:
      3> perform the actions as specified in clause 5.2.2.5;
    2> else:
      3> perform the actions specified in clause 5.2.2.4.1.
  1> if the UE is in RRC_CONNECTED with an active BWP with common search space configured by searchSpaceSIB1 and pagingSearchSpace and has received an indication about change of system information; or
  1> if the UE is in RRC_IDLE or in RRC_INACTIVE:
    2> if ssb-SubcarrierOffset indicates SIB1 is transmitted in the cell (TS 38.213 [13]) and if SIB1 acquisition is required for the UE:
      3> acquire the SIB1, which is scheduled as specified in TS 38.213 [13];
      3> if the UE is unable to acquire the SIB1:
        4> perform the actions as specified in clause 5.2.2.5;
      3> else:
        4> upon acquiring SIB1, perform the actions specified in clause 5.2.2.4.2.
    2> else if SIB1 acquisition is required for the UE and ssb-SubcarrierOffset indicates that SIB1 is not scheduled in the cell:
      3> perform the actions as specified in clause 5.2.2.5.

NOTE: The UE in RRC_CONNECTED is only required to acquire broadcasted SIB1 if the UE can acquire it without disrupting unicast data reception, i.e. the broadcast and unicast beams are quasi co-located.

5.2.2.3.2 Acquisition of an SI Message
For SI message acquisition PDCCH monitoring occasion(s) are determined according to searchSpaceOtherSystemInformation. If searchSpaceOtherSystemInformation is set to zero, PDCCH monitoring occasions for SI message reception in SI-window are same as PDCCH monitoring occasions for SIB1 where the mapping between PDCCH monitoring occasions and SSBs is specified in TS 38.213[13]. If searchSpaceOtherSystemInformation is not set to zero, PDCCH monitoring occasions for SI message are determined based on search space indicated by searchSpaceOtherSystemInformation. PDCCH monitoring occasions for SI message which are not overlapping with UL symbols (determined according to tdd-UL-DL-Configuration-Common) are sequentially numbered from one in the SI window. The $[xxN+K]^{th}$ PDCCH monitoring occasion (s) for SI message in SI-window corresponds to the $K^{th}$ transmitted SSB, where x=0, 1, . . . X−1, K=1, 2, . . . N, N is the number of actual transmitted SSBs determined according to ssb-PositionsInBurst in SIB1 and X is equal to CEIL(number of PDCCH monitoring occasions in SI-window/N). The actual transmitted SSBs are sequentially numbered from one in ascending order of their SSB indexes. The UE assumes that, in the SI window, PDCCH for an SI message is transmitted in at least one PDCCH monitoring occasion corresponding to each transmitted SSB and thus the selection of SSB for the reception SI messages is up to UE implementation.

When acquiring an SI message, the UE shall:
  1> determine the start of the SI-window for the concerned SI message as follows:
    2> for the concerned SI message, determine the number n which corresponds to the order of entry in the list of SI messages configured by schedulingInfoList in si-SchedulingInfo in SIB1;
    2> determine the integer value x=(n−1)×w, where w is the si-WindowLength;
    2> the SI-window starts at the slot #a, where a=x mod N, in the radio frame for which SFN mod T=FLOOR(x/N), where T is the si-Periodicity of the concerned SI message and N is the number of slots in a radio frame as specified in TS 38.213 [13];
  1> receive the PDCCH containing the scheduling RNTI, i.e. SI-RNTI in the PDCCH monitoring occasion(s) for SI message acquisition, from the start of the SI-window and continue until the end of the SI-window whose absolute length in time is given by si-WindowLength, or until the SI message was received;
  1> if the SI message was not received by the end of the SI-window, repeat reception at the next SI-window occasion for the concerned SI message in the current modification period;

NOTE 1: The UE is only required to acquire broadcasted SI message if the UE can acquire it without disrupting unicast data reception, i.e. the broadcast and unicast beams are quasi co-located.

NOTE 2: The UE is not required to monitor PDCCH monitoring occasion(s) corresponding to each transmitted SSB in SI-window.

NOTE 3: If the concerned SI message was not received in the current modification period, handling of SI message acquisition is left to UE implementation.

1> perform the actions for the acquired SI message as specified in sub-clause 5.2.2.4.

5.2.2.3.3 Request for on Demand System Information

The UE shall:
1> if SIB1 includes si-SchedulingInfo containing si-RequestConfigSUL and criteria to select supplementary uplink as defined in TS 38.321[13], clause 5.1.1 is met:
  2> trigger the lower layer to initiate the Random Access procedure on supplementary uplink in accordance with [3] using the PRACH preamble(s) and PRACH resource(s) in si-RequestConfigSUL corresponding to the SI message(s) that the UE requires to operate within the cell, and for which si-BroadcastStatus is set to notBroadcasting;
  2> if acknowledgement for SI request is received from lower layers:
    3> acquire the requested SI message(s) as defined in sub-clause 5.2.2.3.2, immediately;
1> else if SIB1 includes si-SchedulingInfo containing si-RequestConfig and criteria to select normal uplink as defined in TS 38.321[13], clause 5.1.1 is met:
  2> trigger the lower layer to initiate the random access procedure on normal uplink in accordance with TS 38.321 [3] using the PRACH preamble(s) and PRACH resource(s) in si-RequestConfig corresponding to the SI message(s) that the UE requires to operate within the cell, and for which si-BroadcastStatus is set to notBroadcasting;
  2> if acknowledgement for SI request is received from lower layers:
    3> acquire the requested SI message(s) as defined in sub-clause 5.2.2.3.2, immediately;
1> else:
  2> apply the timeAlignmentTimerCommon included in SIB1;
  2> apply the CCCH configuration as specified in 9.1.1.2;
  2> initiate transmission of the RRCSystemInfoRequest message in accordance with 5.2.2.3.4;
  2> if acknowledgement for RRCSystemInfoRequest message is received from lower layers:
    3> acquire the requested SI message(s) as defined in sub-clause 5.2.2.3.2, immediately;
1> if cell reselection occurs while waiting for the acknowledgment for SI request from lower layers:
  2> reset MAC;
  2> if SI request is based on RRCSystemInfoRequest message:
    3> release RLC entity for SRB0.

NOTE: After RACH failure for SI request it is up to UE implementation when to retry the SI request.

Figure 6:
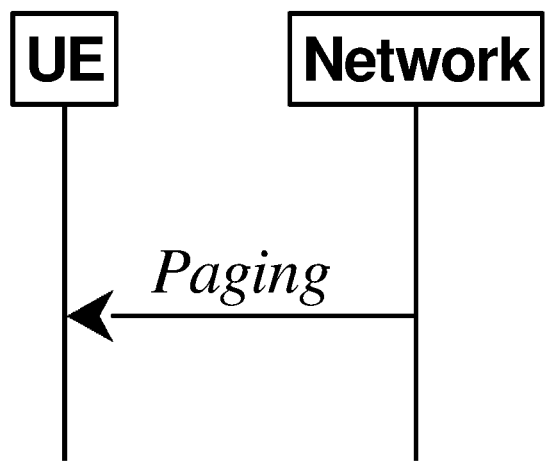
FIG. 6 is a reproduction of FIG. 5.3.2.1-1 of 3GPP TS 38.331 V15.5.0.

Reception of a paging message in NR is shown in FIG. 6 (which is a reproduction of FIG. 5.3.2.1-1, entitled "Paging", of 3GPP TS 38.331 V15.5.0) and discussed in 3GPP TS 38.331 as follows:

5.3.2.3 Reception of the Paging Message by the UE

Upon receiving the Paging message, the UE shall:
1> if in RRC_IDLE, for each of the PagingRecord, if any, included in the Paging message:
  2> if the ue-Identity included in the PagingRecord matches the UE identity allocated by upper layers:
    3> forward the ue-Identity and access Type (if present) to the upper layers;
1> if in RRC_INACTIVE, for each of the PagingRecord, if any, included in the Paging message:
  2> if the ue-Identity included in the PagingRecord matches the UE's stored full-RNTI:
    3> if the UE is configured by upper layers with Access Identity 1:
      4> initiate the RRC connection resumption procedure according to 5.3.13 with resumeCause set to mps-PriorityAccess;
    3> else if the UE is configured by upper layers with Access Identity 2:
      4> initiate the RRC connection resumption procedure according to 5.3.13 with resumeCause set to mcs-PriorityAccess;
    3> else if the UE is configured by upper layers with one or more Access Identities equal to 11-15:
      4> initiate the RRC connection resumption procedure according to 5.3.13 with resumeCause set to highPriorityAccess;
    3> else:
      4> initiate the RRC connection resumption procedure according to 5.3.13 with resumeCause set to mt-Access;
  2> else if the ue-Identity included in the PagingRecord matches the UE identity allocated by upper layers:
    3> forward the ue-Identity to upper layers and accessType (if present) to the upper layers;
    3> perform the actions upon going to RRC_IDLE as specified in 5.3.11 with release cause 'other'.

Figure 7:
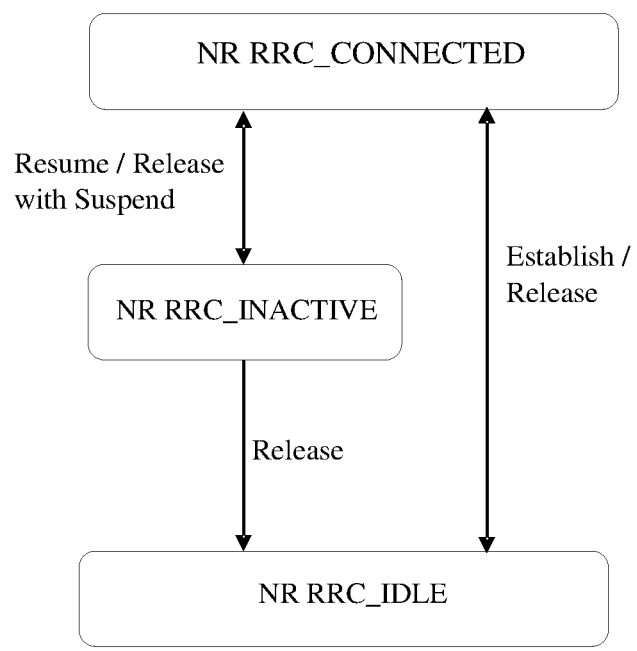
FIG. 7 is a reproduction of FIG. 4.2.1-1 of 3GPP TS 38.331 V15.5.0.

An overview of UE RRC (Radio Resource Control) state machine and state transitions in NR is shown in FIG. 7 (which is a reproduction of FIG. 4.2.1-1, entitled "UE state machine and state transitions in NR", of 3GPP TS 38.331 V15.5.0) and discussed in 3GPP TS 38.331 as follows:

5.3.1.1 RRC Connection Control

RRC connection establishment involves the establishment of SRB1. The network completes RRC connection establishment prior to completing the establishment of the NG connection, i.e. prior to receiving the UE context information from the 5GC. Consequently, AS security is not activated during the initial phase of the RRC connection. During this initial phase of the RRC connection, the network may configure the UE to perform measurement reporting, but the UE only sends the corresponding measurement reports after successful AS security activation. However, the UE only accepts a re-configuration with sync message when AS security has been activated.

Upon receiving the UE context from the 5GC, the RAN activates AS security (both ciphering and integrity protection) using the initial AS security activation procedure. The RRC messages to activate AS security (command and successful response) are integrity protected, while ciphering is started only after completion of the procedure. That is, the response to the message used to activate AS security is not ciphered, while the subsequent messages (e.g. used to establish SRB2 and DRBs) are both integrity protected and ciphered. After having initiated the initial AS security activation procedure, the network may initiate the establishment of SRB2 and DRBs, i.e. the network may do this prior to receiving the confirmation of the initial AS security activation from the UE. In any case, the network will apply both ciphering and integrity protection for the RRC reconfiguration messages used to establish SRB2 and DRBs. The network should release the RRC connection if the initial AS security activation and/or the radio bearer establishment fails.

The release of the RRC connection normally is initiated by the network. The procedure may be used to re-direct the UE to an NR frequency or an E-UTRA carrier frequency.

The suspension of the RRC connection is initiated by the network. When the RRC connection is suspended, the UE stores the UE Inactive AS context and any configuration received from the network, and transits to RRC_INACTIVE state. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform a RNA update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes SRB(s) and DRB(s).

In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate NAS level recovery (in this case the network sends an RRC setup message).

Figure 8:
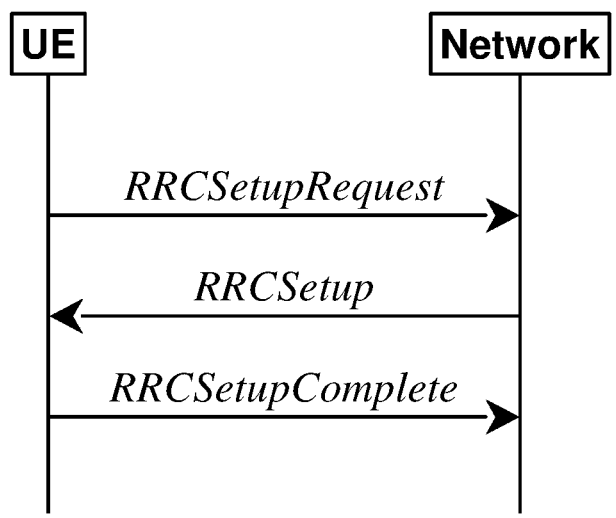
FIG. 8 is a reproduction of FIG. 5.3.3.1-1 of 3GPP TS 38.331 V15.5.0.

To enter RRC_CONNECTED from RRC_IDLE, RRC connection establishment procedure is used as discussed in 3GPP TS 38.331 and as shown in FIG. 8 (which is a reproduction of FIG. 5.3.3.1-1, entitled "RRC connection establishment, successful", of 3GPP TS 38.331 V15.5.0).

Figure 9:
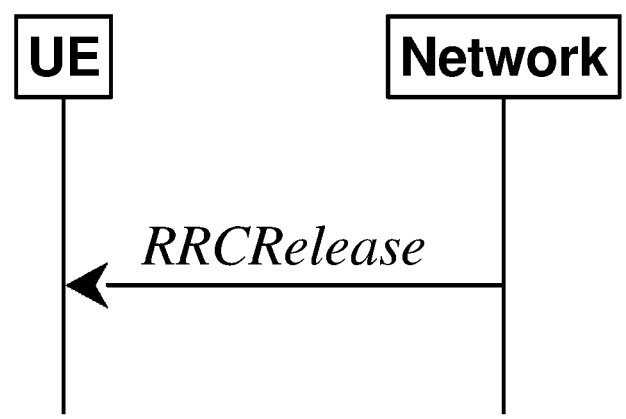
FIG. 9 is a reproduction of FIG. 5.3.8.1-1 of 3GPP TS 38.331 V15.5.0.

As discussed in 3GPP TS 38.331, RRC connection release procedure (as shown in FIG. 9 which is a reproduction of FIG. 5.3.8.1-1, entitled "RRC connection release, successful", of 3GPP TS 38.331 V15.5.0) could be used to to release the RRC connection (e.g. from RRC_CONNECTED to RRC_IDLE) or to suspend the RRC connection (e.g. from RRC_CONNECTED to RRC_INACTVE). Whether to enter RRC_IDLE or RRC_INACTVE would depend on the indication in a RRCRelease message (e.g. presence of suspendConfig as discussed in 3GPP TS 38.331). The UE behaviour upon reception of the RRCRelease message is discussed in 3GPP TS 38.331 as follows:

5.3.8.3 Reception of the RRCRelease by the UE
The UE shall:
1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> if T390 is running:
  2> stop timer T390 for all access categories;
  2> perform the actions as specified in 5.3.14.4;
1> if the AS security is not activated, perform the actions upon going to RRC_IDLE as specified in 5.3.11 with the release cause 'other' upon which the procedure ends;
1> if the RRCRelease message includes redirectedCarrierInfo indicating redirection to eutra:
  2> if cnType is included:
    3> after the cell selection, indicate the available CN Type(s) and the received cnType to upper layers;
NOTE: Handling the case if the E-UTRA cell selected after the redirection does not support the core network type specified by the cnType, is up to UE implementation.
1> if the RRCRelease message includes the cellReselectionPriorities:
  2> store the cell reselection priority information provided by the cellReselectionPriorities;
  2> if the t320 is included:
    3> start timer T320, with the timer value set according to the value of t320;
1> else:
  2> apply the cell reselection priority information broadcast in the system information;
1> if deprioritisationReq is included:
  2> start or restart timer T325 with the timer value set to the deprioritisationTimer signalled;
  2> store the deprioritisationReq until T325 expiry;
1> if the RRCRe/ease includes suspendConfig:
  2> apply the received suspendConfig;
  2> reset MAC and release the default MAC Cell Group configuration, if any;
  2> re-establish RLC entities for SRB1;
  2> if the RRCRe/ease message with suspendConfig was received in response to an RRCResumeRequest or an RRCResumeRequest1:
    3> stop the timer T319 if running;
    3> in the stored UE Inactive AS context:
      4> replace the $K_{gNB}$ and $K_{RRCint}$ keys with the current $K_{gNB}$ and $K_{RRCint}$ keys;
      4> replace the C-RNTI with the temporary C-RNTI in the cell the UE has received the RRCRe/ease message;
      4> replace the cellIdentity with the cellIdentity of the cell the UE has received the RRCRe/ease message;
      4> replace the physical cell identity with the physical cell identity of the cell the UE has received the RRCRe/ease message;
      4> replace the suspendConfig with the current suspendConfig;
  2> else:
    3> store in the UE Inactive AS Context the configured suspendConfig, the current $K_{gNB}$ and $K_{RRCint}$ keys, the ROHC state, the C-RNTI used in the source PCell, the cellIdentity and the physical cell identity of the source PCell, and all other parameters configured except with ReconfigurationWithSync;
  2> suspend all SRB(s) and DRB(s), except SRB0;
  2> indicate PDCP suspend to lower layers of all DRBs;
  2> if the t380 is included:
    3> start timer T380, with the timer value set to t380;
  2> if the RRCRe/ease message is including the waitTime:

3> start timer T302 with the value set to the wait-Time;
3> inform the upper layer that access barring is applicable for all access categories except categories '0' and '2';
2> indicate the suspension of the RRC connection to upper layers;
2> enter RRC_INACTIVE and perform cell selection as specified in TS 38.304 [20];
1> else
2> perform the actions upon going to RRC_IDLE as specified in 5.3.11, with the release cause 'other'.

Figure 10:
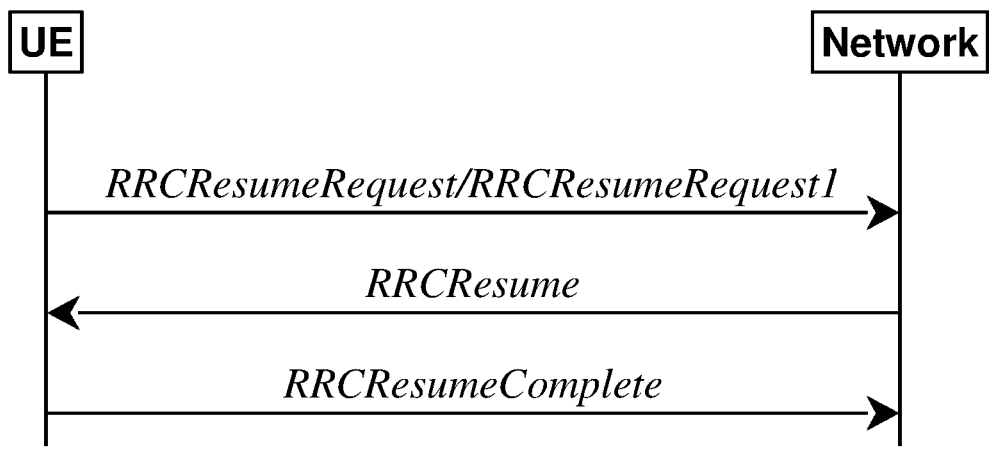
FIG. 10 is a reproduction of FIG. 5.3.13.1-1 of 3GPP TS 38.331 V15.5.0.
Figure 11:
FIG. 11 is a reproduction of FIG. 5.3.13.1-4 of 3GPP TS 38.331 V15.5.0.

RRC connection resume procedure (as discussed 3GPP TS 38.331) could be used to resume a suspended RRC connection (as shown in FIG. 10 which is a reproduction of FIG. 5.3.13.1-1, entitled "RRC connection resume, successful", of 3GPP TS 38.331 V15.5.0) (e.g. from RRC_INACTIVE to RRC_CONNECTED) or to perform an RNA update (e.g. no need to enter RRC_CONNECTED) (as shown in FIG. 11 which is a reproduction of FIG. 5.3.13.1-4, entitled "RRC connection resume followed by network suspend, successful", of 3GPP TS 38.331 V15.5.0). Whether the RRC connection resume procedure is used for the RNA update or not would depend on the indication in a RRCResumeRequest (or RRCResumeRequest1) message (e.g. whether ResumeCause is set to ma-Update as discussed 3GPP TS 38.331).

One of the objectives in the study item for multi-USIM devices (as discussed in 3GPP SP-190248) is to develop a network-controlled mechanism allowing for suspension (or release) and resumption of an ongoing connection in the 3GPP system associated with USIM A, so that the UE can temporarily leave to the 3GPP system associated with USIM B to perform some signaling activity, e.g. transmission and/or reception of control signaling and/or data.

Although the suspension (or release) and resumption of an ongoing connection is already supported in NR (as discussed in 3GPP TS 38.331), the 3GPP system associated with USIM A is unable to properly control the suspension (or release) and resumption because the 3GPP system associated with USIM A cannot be aware of UE's signaling activity to be performed in the 3GPP system associated with USIM B. So, a new mechanism needs to be considered.

A general concept of the invention is equipping a UE with more than one (enabled) USIM card, including a first USIM and a second USIM, the UE could transmit, to a 3GPP system associated with the first USIM, a message carrying information related to signaling activity to be performed in a 3GPP system associated with the second USIM. Transmission of the message could be triggered in response to the signaling activity. For example, when the UE detects the signaling activity (is going to occur), the UE could initiate the transmission of the message.

Figure 12:
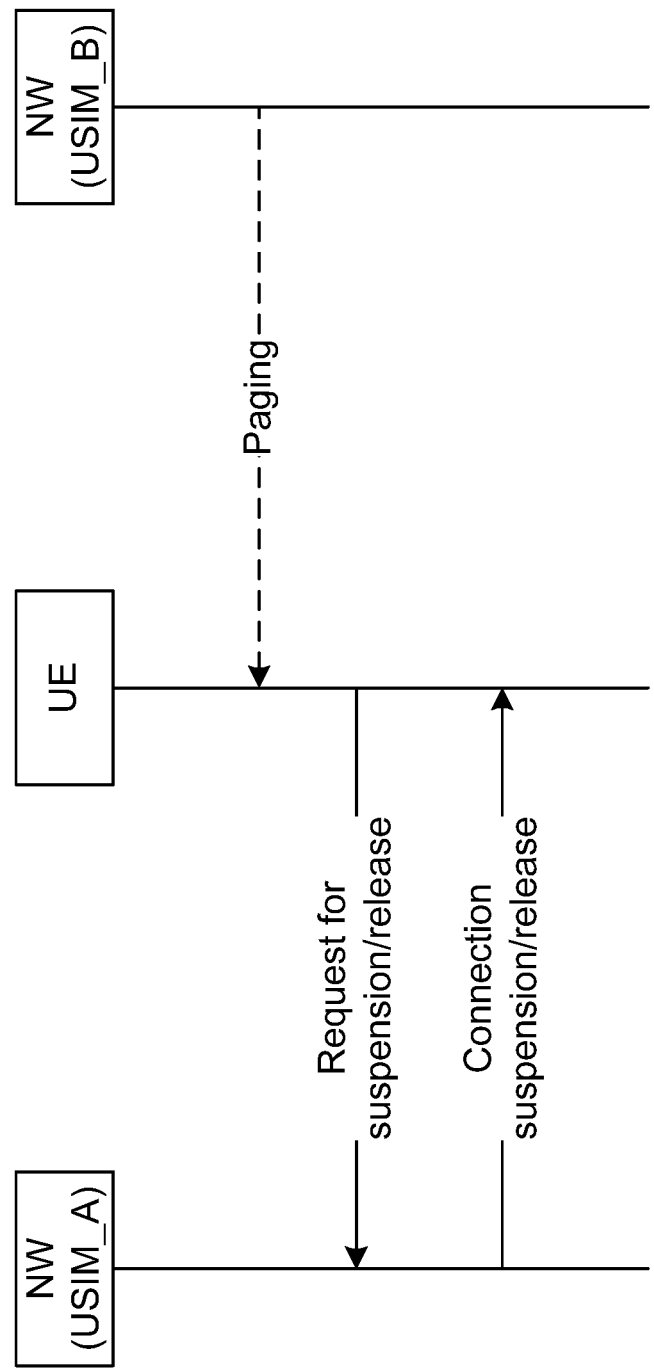
FIG. 12 is a diagram according to one exemplary embodiment.

Based on the information, the network side of the 3GPP system associated with the first USIM could know that the UE will (or tends to) perform the signaling activity in the 3GPP system associated with the second USIM. Then, the network side (e.g. gNB) of the 3GPP system associated with the first USIM could (decide whether to) suspend (or release) RRC connection of the UE in the 3GPP system associated with the first USIM (e.g. based on the information). FIG. 12 shows an example.

Figure 13:
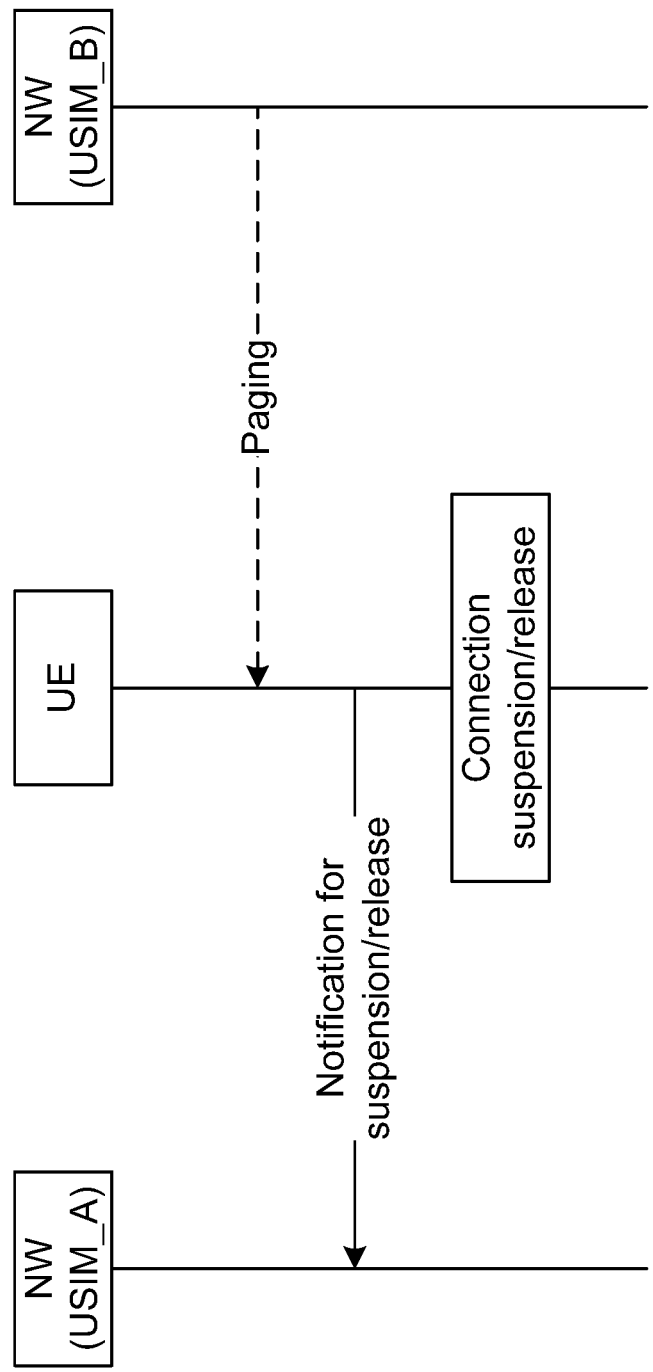
FIG. 13 is a diagram according to one exemplary embodiment.

Alternatively, the UE could suspend (or release) the RRC connection by itself (e.g. without command from the network side) after transmitting the message (successfully). FIG. 13 shows an example.

The information could indicate one or multiple of the following:

A Cause to Perform the Signaling Activity

If the signaling activity involves a RRC connection establishment procedure, the cause could be indicated by a RRCSetupRequest message (of the RRC connection establishment procedure). The RRCSetupRequest message may be as discussed in 3GPP TS 38.331. If the signaling activity involves a RRC connection resume procedure, the cause could be indicated by a RRCResumeRequest (or RRCResumeRequest1) message (of the RRC connection resume procedure). The RRCResumeRequest (or RRCResumeRequest1) message may be as discussed in 3GPP TS 38.331. In other words, the UE indicates the cause by the RRCSetupRequest message, RRCResumeRequest message, or RRCResumeRequest1 message (which is involved in the signaling activity or which is part of the signaling activity). The RRCSetupRequest message, RRCResumeRequest message, or RRCResumeRequest1 message is transmitted to the 3GPP system associated with the second USIM. If the signaling activity is initiated by a reception of a paging message (as discussed in 3GPP TS 38.331) for the second USIM, the cause could be indicated by the paging message. If the signaling activity is initiated by a reception of a short message (as discussed in 3GPP TS 38.331) for the second USIM, the cause could be indicated by the short message.

The cause could be emergency (call or service), high priority access, mobile terminating (MT) access, mobile originating (MO) signalling, mobile originating data, mobile originating voice call, mobile originating video call, mobile originating SMS (Short Message Service), MPS (Multimedia Priority Service) priority access, or MCS (Mission Critical Service) priority access. Alternatively or additionally, the cause could be a RNA (RAN-based Notifications Area) update. Alternatively or additionally, the cause could be IMS (IP Multimedia System) voice, IMS SMS, IMS other service (e.g. not voice/SMS related), or other PS (Packet Switching) service (e.g. not IMS related). Alternatively or additionally, the cause could be system information acquisition (for ETWS (Earthquake and Tsunami Warning System), for CMAS (Commercial Mobile Alert Service), and/or for other system information) or request for on demand system information. Alternatively or additionally, the cause could be signaling activity for another USIM.

Priority of the Signaling Activity

The priority could be priority of data (or control signaling) of the signaling activity to be received by the UE. The priority could be priority of data (or control signaling) of the signaling activity to be transmitted by the UE.

The priority could be represented by a priority index.

Association between the priority and the signaling activity could be configured by the 3GPP system associated with the first USIM. Association between the priority and the signaling activity could be configured by the 3GPP system associated with the second USIM.

The priority could be indicated by a paging message for the second USIM. The priority could be indicated by a short message for the second USIM.

QoS (Quality of Service) of the Signaling Activity

The QoS could be QoS of data (or control signaling) of the signaling activity to be received by the UE. The QoS could be QoS of data (or control signaling) of the signaling activity to be transmitted by the UE. The QoS could be represented by a QoS index or a QoS Class Identifier (QCI).

Association between the QoS and the signaling activity could be configured by the 3GPP system associated with the first USIM. Association between the QoS and the signaling activity could be configured by the 3GPP system associated with the second USIM.

The QoS could be indicated by a paging message for the second USIM. The QoS could be indicated by a short message for the second USIM.

Duration of the Signaling Activity

The duration could be expected time period, e.g. the signaling activity would occur. Alternatively, the duration could be at most time period, e.g. the signaling activity would occur. Alternatively, the duration could be at least time period, e.g. the signaling activity would occur. Based on the information of the duration, the 3GPP system associated with the first USIM may not try to communicate with the UE during the duration, e.g. unless higher priority signaling activity occurs.

The duration could be indicated by a paging message for the second USIM. The duration could be indicated by a short message for the second USIM. The duration could be estimated by the UE.

Duration of the RRC Connection of the UE in the 3GPP System Associated with the First USIM to be Suspended (or Released)

The duration could be expected time period, e.g. the RRC connection to be suspended (or released). Alternatively, the duration could be at most time period, e.g. the RRC connection to be suspended (or released). Alternatively, the duration could be at least time period, e.g. the RRC connection to be suspended (or released). Based on the information of the duration, the 3GPP system associated with the first USIM may not try to communicate with the UE during the duration, e.g. unless higher priority signaling activity occurs.

The duration could be indicated by a paging message for the second USIM. The duration could be indicated by a short message for the second USIM. The duration could be estimated by the UE.

A discussion of the signal activity is now provided. The signaling activity could be initiated by a reception of a paging message for the second USIM. Alternatively, the signaling activity could be initiated by a reception of a short message.

The signaling activity could be (or could include) one or multiple of following:
- Establishment of a RRC connection in the 3GPP system associated with the second USIM
- Resume of a RRC connection in the 3GPP system associated with the second USIM
- RNA update
- System information acquisition (for ETWS, for CMAS and/or for other system information)
- Request for on demand system information After suspension (or release) of the RRC connection of the UE in the 3GPP system associated with the first USIM, the network side of the 3GPP system associated with the first USIM may not page the UE (during the duration), e.g. if the signaling activity is more important than the reason to page the UE.

The message could be used to request the 3GPP system associated with the first USIM to suspend (or release) the RRC connection of the UE in the 3GPP system associated with the first USIM. The message could include an indication about whether to request for suspension or for release. In other words, whether to suspend (or release) the RRC connection of the UE in the 3GPP system associated with the first USIM is controlled by the network side of the 3GPP system associated with the first USIM.

Alternatively, the message could be used to notify the 3GPP system associated with the first USIM that the RRC connection of the UE in the 3GPP system associated with the first USIM is (going to be) released (or suspended) by the UE itself (without permission from the network side of the 3GPP system associated with the first USIM). The message could include an indication about whether to notify for suspension or for release.

The message could include an indication about whether the message is used to request suspension (or release) or to notify release (or suspension). The UE could decide whether to use the message to request suspension (or release) or to notify release (or suspension) based on the cause to perform the signaling activity.

For example, if the signaling activity is urgent or high priority (e.g. emergency, high priority access, MPS priority access, MCS priority access), the message could be used to notify that the UE would release (or suspend) the RRC connection by UE itself. If the signaling activity is not urgent or not high priority, the message could be used to request the network side to suspend (or release) the RRC connection. Mobile terminating access and/or IMS voice could be urgent or high priority. Alternatively, mobile terminating access and/or IMS voice may not be urgent or high priority.

Alternatively or additionally, the UE could decide whether to use the message to request suspension (or release) or to notify release (or suspension) based on USIM configuration (of the first USIM and/or the second USIM). Alternatively or additionally, the UE could decide whether to use the message to request suspension (or release) or to notify release (or suspension) based on user preference (configured by the user of the UE).

The 3GPP system associated with the first USIM (or the second USIM) could decide whether to enable (or disable) transmission of the message, e.g. based on configuration from the 3GPP system associated with the first USIM to the UE. For example, if the transmission of the message is not enabled (or is disabled), the UE is not allowed to request for suspension (or release), e.g. due to the signaling activity.

The 3GPP system associated with the first USIM (or the second USIM) could decide whether to enable (or disable) release (or suspension) of the RRC connection in the 3GPP system associated with the first USIM by the UE itself, e.g. based on configuration from the 3GPP system associated with the first USIM to the UE. For example, if the transmission of the message is not enabled (or is disabled), the UE is not allowed to release (or suspend) the RRC connection of the UE in the 3GPP system associated with the first USIM by the UE itself, e.g. due to the signaling activity.

The UE could decide whether to transmit the message to the 3GPP system associated with the first USIM based on one or multiple of following:

The Cause to Perform the Signaling Activity

The UE could transmit the message if the cause is one or multiple of following: emergency (call or service), high priority access, mobile terminating access, mobile originating signalling, mobile originating data, mobile originating voice call, mobile originating video call, mobile originating SMS, MPS priority access, MCS priority access, RNA update, IMS voice, IMS SMS, IMS other service (e.g. not voice/SMS related), other PS service (e.g. not IMS related), system information acquisition (for ETWS, for CMAS and/or for other system information), and/or request for on demand system information. The UE may not transmit the message if the cause is one or multiple of following: mobile originating data, mobile originating SMS, RNA update, IMS SMS, IMS other service (e.g. not voice/SMS related), other PS service (e.g. not IMS related), system information acquisition (for ETWS, for CMAS and/or for other system information), request for on demand system information, paging monitoring, short message monitoring, or SSB reception.

For example, the UE could transmit the message if the cause is system information acquisition for ETWS. The UE may not transmit the message if the cause is system information acquisition (only) for parameters related to cell reselection. The UE may not transmit the message if the cause is request for on demand system information. The UE may not transmit the message if the cause is RNA update.

Whether to Establish (or Resume) a RRC Connection in the 3GPP System Associated with the Second USIM or not For example, if the UE tends to establish (or resume) a RRC connection in the 3GPP system associated with the second USIM (due to the signaling activity), the UE could transmit the message. If the UE does not tend to establish (or resume) a RRC connection in the 3GPP system associated with the second USIM (due to the signaling activity), the UE may not transmit the message.

Whether the UE Tends to Enter RRC_CONNECTED in the 3GPP System Associated with the Second USIM For example, if the UE tends to enter RRC_CONNECTED in the 3GPP system associated with the second USIM (due to the signaling activity), the UE could transmit the message. If the UE does not tend to enter RRC_CONNECTED in the 3GPP system associated with the second USIM (due to the signaling activity), the UE may not transmit the message.

The Duration of the Signaling Activity

For example, if the duration is short, suspension (or release) of the RRC connection may not be required. If the duration is long, the RRC connection could be suspended (or released).

USIM Configuration (of the First USIM and/or the Second USIM)

User Preference (Configured by the User of the UE)

In one embodiment, the RRC connection could be suspended by a RRC connection release procedure (as discussed in 3GPP TS 38.331). Alternatively, the RRC connection could be released by a RRC connection release procedure (as discussed in 3GPP TS 38.331). The RRC connection could be established by a RRC connection establishment procedure (as discussed in 3GPP TS 38.331). The RRC connection could be resumed by a RRC connection resume procedure (as discussed in 3GPP TS 38.331).

The UE could skip delay of the actions (e.g. 60 ms or successfully acknowledged the receipt of the RRCRelease message) (as discussed in 3GPP TS 38.331) for suspension (or release) of RRC connection at least when (or if) the suspension (or release) is due to the signaling activity.

The message could be a RRC message, e.g. UEAssistanceInformation message (as discussed in 3GPP TS 38.331) or a RRC (connection) release request message. Alternatively, the message could be a NAS message. The RRC connection in above could be replaced by NAS connection.

The 3GPP system in above could be replaced by (serving) cell, network, network node, base station, eNB, or gNB. The 3GPP system associated with the first USIM could be LTE, LTE-A, or NR system. The 3GPP system associated with the second USIM could be LTE, LTE-A, or NR system. The network side could be a base station, eNB, or gNB.

Figure 14:
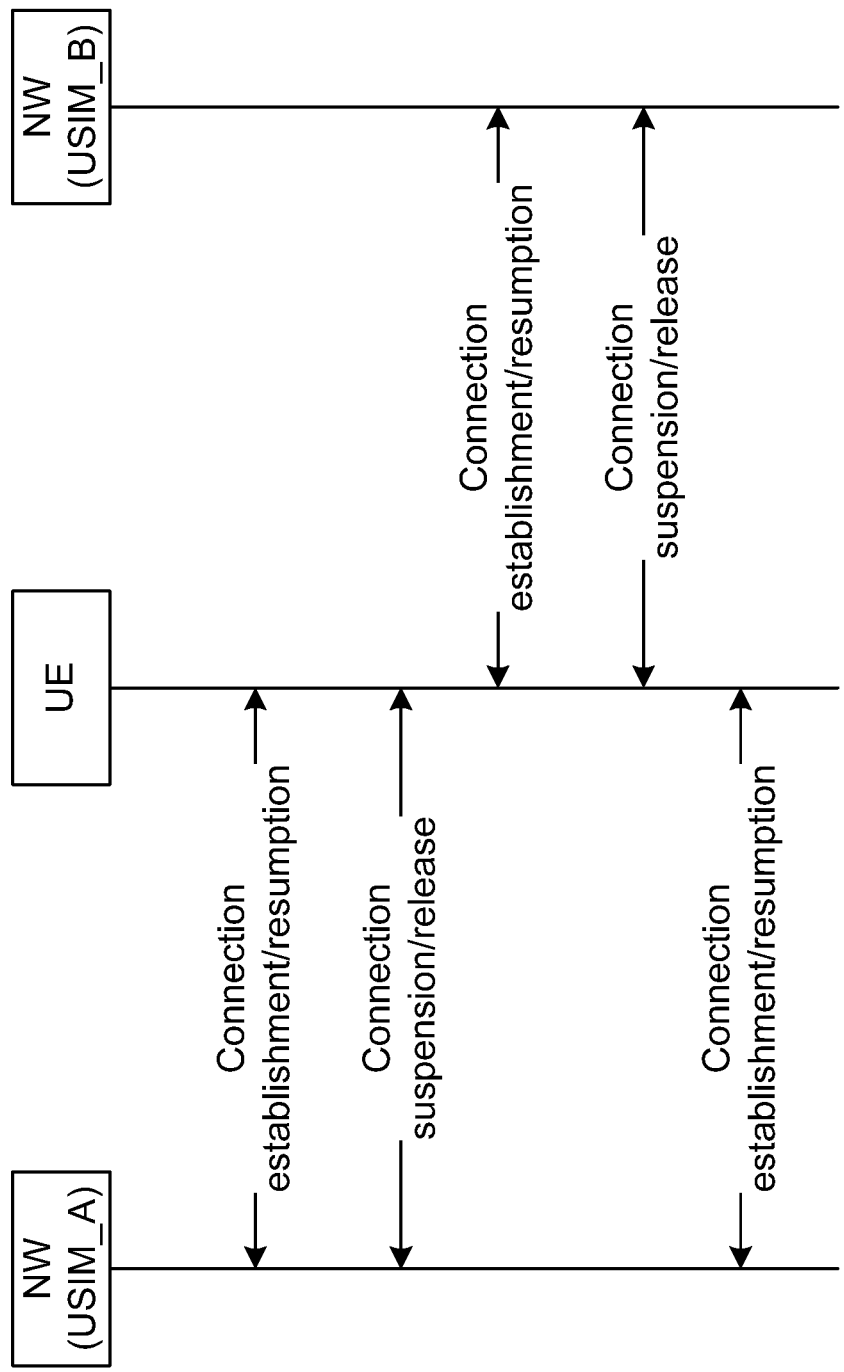
FIG. 14 is a diagram according to one exemplary embodiment.

FIG. 14 shows an example of connection suspension (or release) and resumption according to one embodiment.

Figure 15:
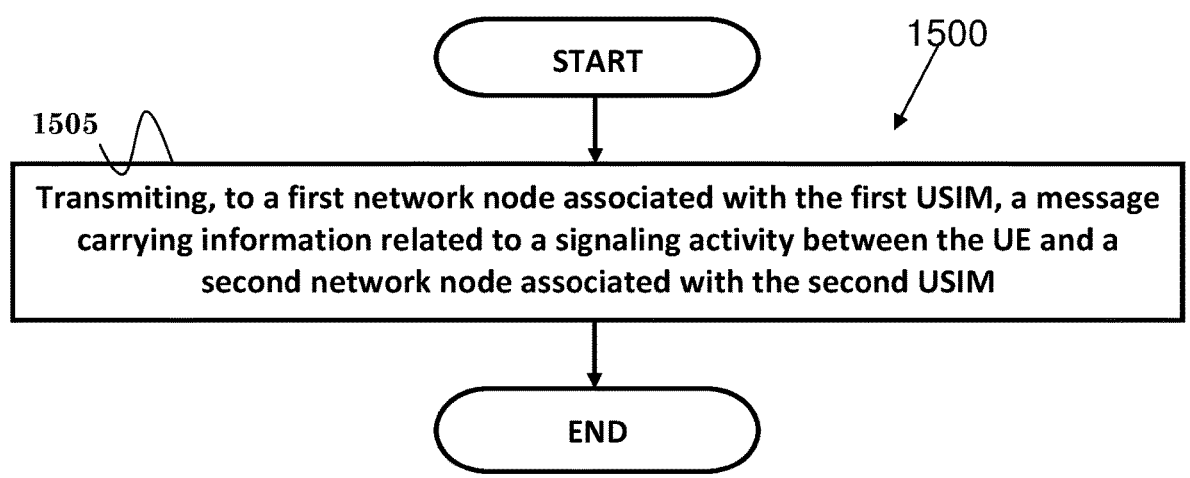
FIG. 15 is a flow chart according to one exemplary embodiment.

FIG. 15 is a flow chart 1500 according to one exemplary embodiment from the perspective of a UE with a first USIM and a second USIM. In step 1505, the UE transmits, to a first network node associated with the first USIM, a message carrying information related to a signaling activity between the UE and a second network node associated with the second USIM.

In one embodiment, the UE could transmit the message in response to (occurrence of) the signaling activity. The message could be used to request the first network node to suspend (or release) a connection between the first network node and the UE. The message could also be used to notify the first network node that a connection between the first network node and the UE is to be released (or suspended) by the UE.

In one embodiment, the information could indicate a duration to suspend (or release) a connection between the first network node and the UE. Alternatively or additionally, the information could indicate a duration for the signaling activity. The information could indicate a cause for the signaling activity. The cause for the signaling activity could be indicated by a paging message (or a short message) initiating the signaling activity. The UE could indicate the cause for the signaling activity by a RRCSetupRequest message (or a RRCResumeRequest) message to the second network node.

In one embodiment, the UE could determine whether to transmit the message at least based on a cause for the signaling activity. The signaling activity could include one or multiple of following: establishment or resume of a RRC (Radio Resource Control) connection to the second network node associated with the second USIM, RNA (Radio Access Network-based Notification Area) update, system information acquisition, or request for on demand system information.

In one embodiment, the message could indicate whether to suspend or release the connection. The message could also indicate whether to request or notify suspension (or release) of a connection between the first network node and the UE. The connection could be suspended (or release) by a RRC connection release procedure.

In one embodiment, the cause could be a first type cause or a second type cause. The UE could transmit the message if the cause belongs to a first type cause. The UE may not transmit the message if the cause belongs to a second type cause.

In one embodiment, the first type cause could include emergency (call or service) and/or high priority access. Alternatively or additionally, the first type cause could include MT access, MO signalling, MO voice call, MO video call, MPS priority access, and/or MCS priority access. Furthermore, the first type cause could include IMS voice.

The second type cause could include MT access, MO signalling, MO voice call, MO video call, MPS priority access, and/or MCS priority access. The second type cause could include paging monitoring, short message monitoring, and/or SSB (Synchronization Signal Block) reception.

In one embodiment, MO data and/or MO SMS could belong to the first type cause or the second type cause. RNA update could belong to the first type cause or the second type cause. IMS SMS and/or IMS service not related to voice/SMS could belong to the first type cause or the second type cause. PS service not related to IMS could belong to the first type cause or the second type cause.

In one embodiment, acquisition of system information for ETWS could belong to the first type cause or the second type cause. Acquisition of system information for CMAS could belong to the first type cause or the second type cause. Acquisition of system information not for ETWS/CMAS, e.g. for cell reselection, could belong to the first type cause or the second type cause. Request for on demand system information could belong to the first type cause or the second type cause.

In one embodiment, the UE could determine whether to transmit the message at least based on whether to establish (or resume) a connection between the second network node and the UE due to the signaling activity. Furthermore, the UE could transmit the message if the connection between the second network node and the UE needs to be established (or resumed) due to the signaling activity. The UE may not transmit the message if the connection between the second network node and the UE does not need to be established (or resumed) due to the signaling activity.

In one embodiment, the connection could be established by a RRC connection establishment procedure. Alternatively, the connection could be resumed by a RRC connection resume procedure.

In one embodiment, the information could indicate a priority associated with the signaling activity. The information could indicate a QoS associated with the signaling activity.

In one embodiment, the message could be a RRC message, or a NAS message. The connection could include a RRC connection and/or a NAS (Non-Access Stratum) connection.

In one embodiment, the first network node could be a base station, eNB, or gNB. The second network node could be a base station, eNB, or gNB.

Referring back to FIGS. 3 and 4, in one exemplary embodiment of a UE with a first USIM and a second USIM, the device 300 includes a program code 312 stored in the memory 310. The CPU 308 could execute program code 312 to enable the UE to transmit, to a first network node associated with the first USIM, a message carrying information related to a signaling activity between the UE and a second network node associated with the second USIM. Furthermore, the CPU 308 can execute the program code 312 to perform all of the above-described actions and steps or others described herein.

Based on above disclosure, network could properly control suspension (or release) of an ongoing connection in the 3GPP system associated with USIM A, so that the UE can leave to the 3GPP system associated with USIM B to perform some signaling activity.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment) including a first USIM (Universal Mobile Telecommunications System Subscriber Identity Module) and a second USIM, comprising:
receiving a second configuration from a first network node associated with the first USIM, wherein the second configuration allows the UE to release a RRC (Radio Resource Control) connection between the first network node and the UE without receiving a command, from the first network node, to release the RRC connection;
transmitting, to the first network node, a message including an indication to request to suspend the RRC connection between the first network node and the UE, or to request to release the RRC connection between the first network node and the UE; and
releasing the RRC connection between the first network node and the UE without receiving the command from the first network node.

2. The method of claim 1, wherein the UE transmits the message in response to occurrence of a signaling activity between the UE and a second network node associated with the second USIM.

3. The method of claim 2, wherein the message indicates a duration to suspend or release the RRC connection between the first network node and the UE, or indicates a duration for the signaling activity.

4. The method of claim 2, wherein the message indicates a cause for the signaling activity.

5. The method of claim 4, further comprising:
receiving a paging message or a short message to initiate the signaling activity, wherein the cause for the signaling activity is indicated by the paging message or the short message.

6. The method of claim 2, wherein the signaling activity includes one or multiple of following: establishment or resume of a RRC connection to the second network node associated with the second USIM, RNA (Radio Access Network-based Notification Area) update, system information acquisition, or request for on demand system information.

7. The method of claim 1, wherein requesting to suspend the RRC connection means requesting to enter RRC_INACTIVE and requesting to release the RRC connection means requesting to enter RRC_IDLE.

8. The method of claim 1, wherein the message is a UE assistance information message.

9. The method of claim 1, further comprising:
receiving a first configuration, from the first network node, to control whether the UE is allowed to transmit the message to request to suspend or release the RRC connection between the first network node and the UE.

10. The method of claim 1, wherein the UE is not allowed to release the RRC connection between the first network node and the UE without receiving the command if transmission of the message is disabled.

11. A UE (User Equipment) with a first USIM (Universal Mobile Telecommunications System Subscriber Identity Module) and a second USIM, comprising:
a processor; and
a memory operatively coupled to the processor, wherein the processor is configured to execute a program code stored in the memory to:
receive a second configuration from a first network node associated with the first USIM, wherein the second configuration allows the UE to release a RRC (Radio Resource Control) connection between the first network node and the UE without receiving a command, from the first network node, to release the RRC connection;
transmit, to the first network node associated with the first USIM, a message including an indication to request to suspend the RRC connection between the first network node and the UE, or to request to release the RRC connection between the first network node and the UE; and
release the RRC connection between the first network node and the UE without receiving the command from the first network node.

12. The UE of claim 11, wherein the UE transmits the message in response to occurrence of a signaling activity between the UE and a second network node associated with the second USIM.

13. The UE of claim 12, wherein the message indicates a duration to suspend or release the RRC connection between the first network node and the UE, or indicates a duration for the signaling activity.

14. The UE of claim 12, wherein the message indicates a cause for the signaling activity.

15. The UE of claim 14, wherein the processor is configured to execute a program code stored in the memory to:
receive a paging message or a short message to initiate the signaling activity, wherein the cause for the signaling activity is indicated by the paging message or the short message.

16. The UE of claim 12, wherein the signaling activity includes one or multiple of the following: establishment or resume of a RRC connection to the second network node associated with the second USIM, RNA (Radio Access Network-based Notification Area) update, system information acquisition, or request for on demand system information.

17. The UE of claim 11, wherein requesting to suspend the RRC connection means requesting to enter RRC_INACTIVE and requesting to release the RRC connection means requesting to enter RRC_IDLE.

18. The UE of claim 11, wherein the message is a UE assistance information message.

19. The UE of claim 11, wherein the processor is configured to execute a program code stored in the memory to:
  receive a first configuration, from the first network node, to control whether the UE is allowed to transmit the message to request to suspend or release the RRC connection between the first network node and the UE.

20. The UE of claim 11, wherein the UE is not allowed to release the RRC connection between the first network node and the UE without receiving the command if transmission of the message is disabled.

* * * * *